United States Patent
Rappl et al.

(10) Patent No.: US 6,642,482 B2
(45) Date of Patent: Nov. 4, 2003

(54) WELDING-TYPE SYSTEM WITH ROBOT CALIBRATION

(75) Inventors: James Rappl, Neenah, WI (US); Robert R. Davidson, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 45 days.

(21) Appl. No.: 09/956,501

(22) Filed: Sep. 19, 2001

(65) Prior Publication Data

US 2003/0052108 A1 Mar. 20, 2003

(51) Int. Cl.$^7$ .................................................. B23K 9/10
(52) U.S. Cl. ................................... 219/130.5; 219/125.1
(58) Field of Search ........................ 219/130.5, 124.34, 219/125.1, 130.31, 130.32, 130.33; 901/42

(56) References Cited

U.S. PATENT DOCUMENTS

| | | | |
|---|---|---|---|
| 5,233,158 A | * 8/1993 | Karakama et al. | 219/130.33 |
| 5,528,013 A | * 6/1996 | Kaihori et al. | 219/130.5 |
| 6,115,273 A | 9/2000 | Geissler | |
| 6,278,082 B1 | * 8/2001 | Shimogama | 219/130.5 |
| 6,329,636 B1 | 12/2001 | Geissler | |
| 6,384,375 B1 | * 5/2002 | Hongu et al. | 219/130.5 |

OTHER PUBLICATIONS

Miller® The Power of Blue ALT 304 Owner's Manual Oct. 2000.
Miller® The Power of Blue Maxstar 200 SD, DX, And LX Owner's Manual Dec. 2000.

* cited by examiner

Primary Examiner—Clifford C. Shaw
(74) Attorney, Agent, or Firm—George R. Corrigan

(57) ABSTRACT

A method and apparatus for calibrating a welding-type power supply and a robot are disclosed. They include entering a calibration mode (in the welding-type power supply) and providing one or two predetermined commands (for a welding parameter) from the robot to the welding-type power supply, and comparing them to two standards. A command scaling curve for the parameter is calculated in response to the comparisons. Predetermined commands, relating to two or more different welding parameters, may be used to calibrate two or more parameters, and to create two or more command scaling curves. Parameters that are calibrated include wire feed speed, voltage and arc length (trim). Feedback from the welding-type power supply may be provided to the robot that is indicative of a commanded output. The predetermined commands may alternatively be user-determined, or provided by a user interface or a memory.

42 Claims, 1 Drawing Sheet

WELDING-TYPE SYSTEM WITH ROBOT CALIBRATION

FIELD OF THE INVENTION

The present invention relates generally to the art of welding-type power supplies. More specifically, it relates to welding-type power supplies used with robots or other peripherals.

BACKGROUND OF THE INVENTION

Welding power supplies or systems are available for a wide variety of processes, and with a wide variety of sophistication. Welding-type power supply or system, as used herein, includes power supplies or systems that provide welding, cutting or heating power, and may include a controller, switches, etc. Traditionally, a good weld required an experienced welder, not only to properly execute the weld, but to properly select operating parameters (such as output voltage, current, power, arc length (trim), pulse width, wire feed speed, etc.)

Now, robots are available that execute the weld. Also, operating parameters may be pre-determined and automatically implemented by a controller in the robot. The program attempts to implement and improve upon the decisions that had been made by the experienced welder. The robot must be able to accurately command the other devices in the weld cell to effectively carry out the programs.

Unfortunately, various errors can be introduced in the system, particularly from the connection between the robot and the welding power source. For example, digital robot command data is converted to an analog value and sent to the welding-type power supply. The power supply converts this analog command to a digital signal and processes it for the desired weld. Data converters on both ends of the system (robot and power supply) can introduce errors to the command signal. Signal distortion can also be introduced by the resistance in cables and connectors. Every welding-type system can have a unique combination of signal errors depending on factors such as wear, equipment age, and other possible environmental factors.

This can cause a problem, particularly when systems are used for the same application. Because the errors may vary between the two systems, two welding-type systems running identical programs on identical work pieces could produce two different welds.

The prior art required the user to adjust the command from the robot to achieve the desired result. For example, if the user wanted 100 ipm wire feed speed, the user can initially set the robot at 100 ipm (or close to it), and monitor the actual output. Then, the user adjusts the requested speed until the desired speed is obtained. If, at 100 ipm, the error is −4%, the user would end up requesting a wirefeed speed of 104 ipm at the robot to obtain, after the error, 100 ipm at the welder. Alternatively, the user could go down to the board level and tweak potentiometers in the welder to try to achieve the desired result. Of course, neither solution is desirable, and requires extra work from the user. Also, to the extent the error is not constant, the user has to calibrate for each different setting.

Accordingly, a simple calibration that doesn't require removal of any panels, permits the synchronization between the robot and welding power supply, and improves installation and long term maintenance of the welding system is desired.

SUMMARY OF THE PRESENT INVENTION

According to a first aspect of the invention a method of calibrating a welding-type power supply and a robot includes entering a calibration mode (in the welding-type power supply) and providing two predetermined commands (for a welding parameter) from the robot to the welding-type power supply, and comparing them to two standards. A command scaling curve for the parameter is calculated in response to the comparisons.

According to a second aspect of the invention a method of calibrating a welding-type power supply and a robot includes providing a weld schedule to the robot. The schedule has at least two (different) settings for one welding parameter. A calibration mode is entered in the welding-type power supply, and the robot provides two commands corresponding to the two settings. The received commands are compared to expected commands for the settings. A command scaling curve for the parameter is calculated in response to the comparisons.

According to a third aspect of the invention a welding-type power supply that may be connected to a robot includes two comparison modules that receive two predetermined commands from the robot, and also receive two standards. The commands and standards correspond to a welding parameter. A curve fitting module receives the results of the comparison modules, and provides a command scaling curve output.

According to a fourth aspect of the invention a welding-type power supply that may be connected to a robot includes a calibration module that has a weld schedule input and a command output. It also has a comparison module that receives the command output and two standards. The command and the standards correspond to a welding parameter. A curve fitting module receives the output of the comparison module, and provides a command scaling curve output.

Two predetermined commands, relating to a different welding parameter, are provided from the robot to the welding-type power supply, and compared to two more standards in one embodiment. A second command scaling curve for the second parameter is calculated in response to the comparisons.

According to various alternatives the parameter(s) includes wire feed speed, voltage and arc length (trim).

Feedback from the welding-type power supply is provided to the robot that is indicative of a commanded output in another embodiment.

The settings are predetermined in one embodiment, and user-determined in another embodiment.

The weld schedule has a third setting for the parameter and the robot provides a third command (corresponding to the third setting) to the welding-type power supply. The third command is compared to a third expected command for the third setting, and the calculation is done in response to the comparisons to the first, second and third expected commands.

The first and second standard inputs are provided by a user interface or a memory in other alternatives.

Other principal features and advantages of the invention will become apparent to those skilled in the art upon review of the following drawings, the detailed description and the appended claims.

Figure 1:
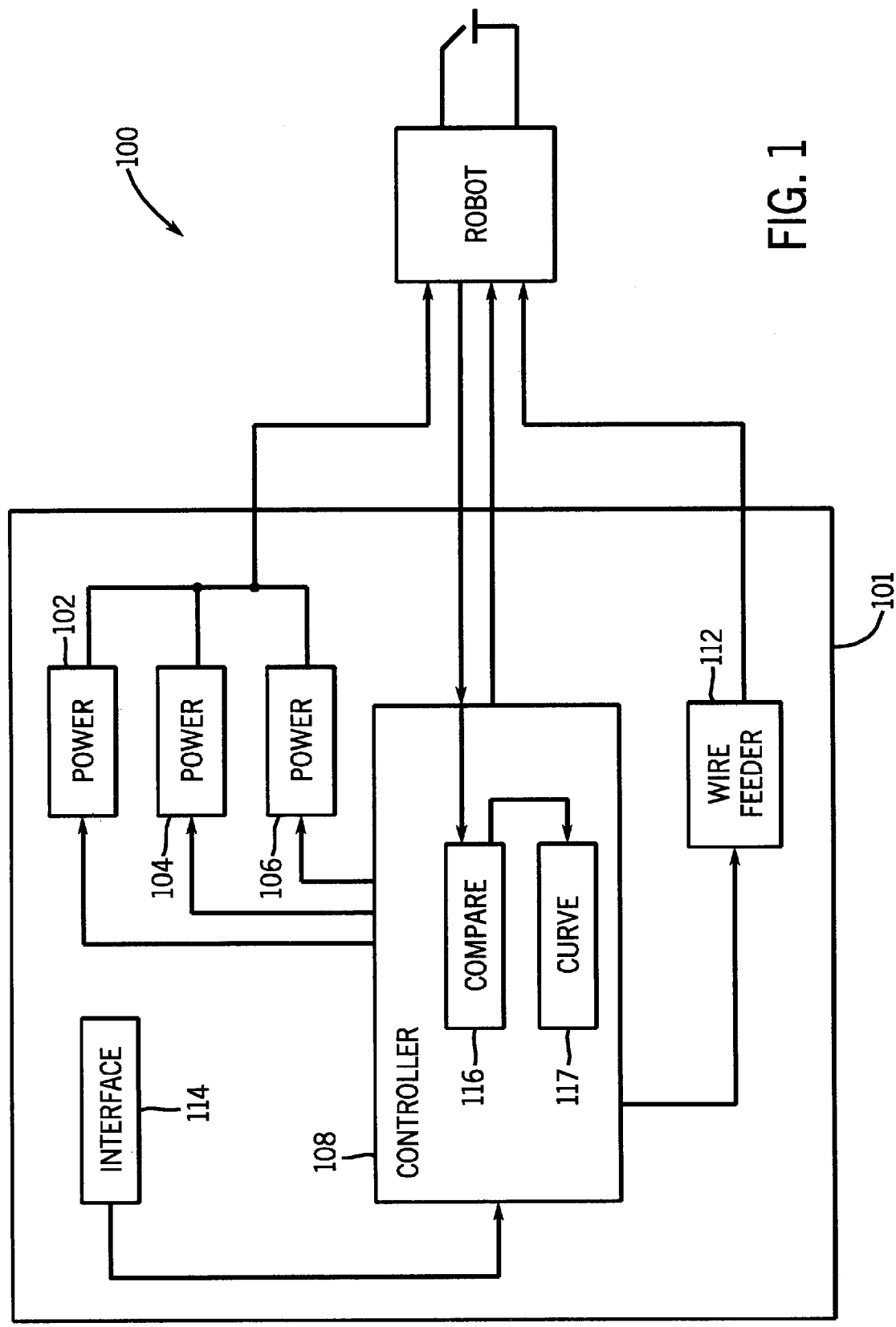
FIG. 1 is diagram of a welding-type system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system with particular components, used for particular applications, it should be understood at the outset that the invention may also be implemented with other components and systems, and be used for other applications.

Generally, the invention relates to calibrating one or more welding parameter commands to a welding-type power supply sent from a robot, although the invention could be implemented with other devices in a weld cell, or outside of a weld cell. Welding parameter, as used herein, includes outputs such as wire feed speed, current, voltage, arc length (trim). Welding-type power supply, as used herein, includes a power supply that provides welding, cutting or plasma power. Calibrating a welding-type power supply and a robot, as used herein, includes correcting an input received by the welding-type power supply.

A calibration mode is entered and commands for two or more settings are sent by the robot to the welding-type power supply. The power supply knows (or is told) the value of the expected commands, and compares the received values to the expected (or ideal) values. The system then calculates a command scaling curve for that parameter, based on the errors from the comparison.

Calibration mode, as used herein, includes a mode where calibration is occurring, and the output of the welding-type power supply may be inhibited. Command, as used herein, includes a signal sent from a device (such as a robot) setting a desired output or value. Command scaling curve, as used herein, includes a curve, equation, look-up table, etc. that adjusts a command in response to a calibration. Expected command for a setting, as used herein, includes the magnitude of the command intended to be received by the device, that will result in the device providing the commanded output. Calculating, as used herein, includes numeric and algebraic calculations, using a look-up table, and digital or analog calculations. Setting, as used herein, includes a setpoint or operating magnitude.

More specifically, the preferred embodiment provides that the user program a predetermined weld schedule into the robot (or it could be stored in memory). Weld schedule, as used herein, includes a sequence of commands or outputs, and may include different outputs for different durations. The user enters the calibration mode by pressing a button (for example, holding the wire speed/amps display push button could be used as the signal to enter the calibration mode) when powering up the system.

Then, the robot begins commanding the schedule, and the welding-type power supply compares the commands received to the commands expected. The preferred embodiment provides for calibrating both ipm and volts, and has as a schedule of at least five seconds at 10V, and 100 ipm, followed by at least five seconds at 40V, 1000 ipm.

The welding-type power supply receives the first command pair (10V, 100 ipm), and compares the commands received to standards or the expected commands for 10V and 100 ipm. Standard, as used herein, includes a threshold or value corresponding to a known level. Then the process is repeated for 100V and 100 ipm. During this mode, the welding-type power supply does not provide output power (or turn the wire feed motor). From the comparisons a command scaling curve is obtained, by solving an equation, by using a look-up table, or other methods.

The preferred embodiment further provides for the welding-type power supply to provide a false feedback signal from a calibration feedback circuit because the robot expects the commands to be obeyed. Thus, the welding-type power supply simulates the output by providing feedback indicative of the commanded output. Indicative of a commanded output, as used herein, includes a feedback signal that indicates the commanded output is being provided, even if it is not. Calibration feedback circuit, as used herein, includes a circuit (digital, analog, hardware and/or software) that provides a feedback during calibration, even if the actual output is not present.

The preferred embodiment provides that the system use predetermined settings for calibration, so the user must input the predetermined weld schedule, or they must be pre-programmed, to insure the predetermined command is provided. Predetermined settings, as used herein, includes settings determined by the system, which the user should not adjust. Predetermined command, as used herein, includes commands determined by the system, which the user should not adjust.

Alternatives includes the user choosing the schedule, and then inputting the schedule to both the robot and the welding-type power supply. Another alternative provides for one parameter to be calibrated. Another alternative provides for calibrating arc length (trim) and wire feed speed. Arc length (trim) calibration may be inferred from voltage calibration, or visa-versa. Other alternatives provide for three parameters (arc length (trim), e.g.), or four or more parameters to be calibrated. Also, more than two points could be used to create the curve. The preferred embodiment provides that the two settings be one near the high end of the range and the other near the low end of the range, thus covering most of the range. Alternatives provide other setting not near the end of the ranges, or using a single point to obtain the calibration curve.

Referring now to FIG. 1, a welding-type system 100 includes a welding-type power supply 101, including sources of welding-type power 102, 104 and 106, a controller 108, a robot 110, a wire feeder 112 and a user interface 114. Controller 108 includes a comparison module 116 and a curve fitting module 117, both of which may be implemented with hardware and/or software.

Comparison module, as used herein, includes may be digital or analog, hardware or software, and compares one or more values, and provides an output indicative of the result (which is greater and/or difference between) of that comparison. Curve fitting module, as used herein, includes a module that provides a command scaling curve output. Module, as used herein, includes digital and analog circuitry, and may be hardware or software, that cooperates to perform one or more functions.

The power sources are operatively connected to the robot, wire feeder and controller (and the user interface through the controller). The power connection to the robot may be through the wire feeder. Operatively connected, as used herein, includes a physical, wireless, or instructional connection that allows components to cooperate.

Controller 108 may share a housing with (and be part of) robot 110, it may share a housing with the sources of power, it may be distributed, or it may have a separate housing. Controller, as used herein, includes digital and analog, circuitry, discrete or integrated circuitry, microprocessors, DSPs, etc., and software, hardware and firmware, located on one or more boards, used to control a device such as a power supply.

Each source of welding-type power also has a controller that responds to system controller 108. The sources of welding-type power are preferably one similar to that found in the Miller Alt304® or Miller MaxStar® welding systems, also described in U.S. patent application Ser. No. 09/540,567, filed Mar. 31, 2000, entitled Method And Apparatus For Receiving A Universal Input Voltage In A Welding, Plasma Or Heating Power Source, and one described in U.S. Pat. No. 6,115,273, entitled Power Converter With Low Loss Switching, issued Sep. 5, 2000, which is hereby incorporated by reference.

The power sources are arranged in parallel, to provide three times the power a single source would provide. Of course, fewer or more (or different) sources of welding-type power could be used. The power sources can be separately controlled, or two could be slaved to the third.

The invention is implemented by pressing the appropriate button on user interface 114 (front panel). This causes controller 108 to enter the calibration mode as described above. Comparison module and 116 and curve fitting module 117 are implemented with software and a microprocessor in the preferred embodiment. They are implemented with analog circuitry in an alternative.

The user then sets the weld schedule (described above) in robot 110. Robot 110 sends the commands that correspond to the settings for the voltage and wire feed speed parameters. A command corresponds to a parameter if it provides magnitude, on/off information, duration, etc. for the parameter. A command corresponds to a setting if it commands a device to provide an output having the magnitude of the setting.

Comparison module 116 receives the commands and digitally compares them to the expected command values. The difference is stored for each parameter, and the process is repeated for the second point. The respective differences are used to calculate a linear correction using $Y=mX+b$, where Y is the corrected value, X is the received value, and m and b are constants determined from the calibration. Specifically, $m=(E1-E2)/(R1-R2)$, where E1 and E2 are the expected values and R1 and R2 are the values received by the comparison module, and $b=E1-mR1$. Alternatives include using a look-up table, a different curve fitting program, etc. After the calibration is completed, the system returns to normal operation.

One embodiment provides that the user input the calibration schedule using user interface 114. The schedule is provided to both the robot and the controller, and the inputs set the expected commands. This provides that the user can choose any calibration points. Other methods could also be used. So long as both schedules are the same, the calibration will be successful.

The invention thus gives the ability to use multiple robot and welders and achieve the same weld, using the same weld data in the robot. The calibration is fast, simple and safe and does not require opening the weld unit. Also, the calibration is backwards compatible with older robots that communicate with analog signals.

Numerous modifications may be made to the present invention which still fall within the intended scope hereof. Thus, it should be apparent that there has been provided in accordance with the present invention a method and apparatus for a welding-type system that provides for robot calibration that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of calibrating a welding-type power supply and a robot, comprising:

entering a calibration mode, and not providing a welding output;

providing a first predetermined command from the robot to the welding-type power supply for at least one welding parameter;

comparing the first predetermined command to a first standard;

providing a second predetermined command from the robot to the welding-type power supply for the at least one welding parameter;

comparing the second predetermined command to a second standard; and calculating a command scaling curve for the parameter in response to the comparisons.

2. The method of claim 1, further comprising, providing feedback from the welding-type power supply to the robot that is indicative of a commanded output.

3. A method of calibrating a welding-type power supply and a robot, comprising:

entering a calibration mode;

providing a first predetermined command from the robot to the welding-type power supply for at least one welding parameter, wherein the at least one parameter is one of wire feed speed, output voltage, and arc length;

comparing the first predetermined command to a first standard;

providing a second predetermined command from the robot to the welding-type power supply for the at least one welding parameter;

comparing the second predetermined command to a second standard; and calculating a command scaling curve for the parameter in response to the comparisons.

4. A method of calibrating a welding-type power supply and a robot, comprising:

entering a calibration mode;

providing a first predetermined command from the robot to the welding-type power supply for at least one welding parameter;

comparing the first predetermined command to a first standard;

providing a second predetermined command from the robot to the welding-type power supply for the at least one welding parameter;

comparing the second predetermined command to a second standard;

calculating a command scaling curve for the parameter in response to the comparisons;

providing a third predetermined command from the robot to the welding-type power supply for a second welding parameter;

comparing the third predetermined command to a third standard;

providing a fourth predetermined command from the robot to the welding-type power supply for the third welding parameter;

comparing the fourth predetermined command to a fourth standard; and calculating a second command scaling curve for the second parameter in response to the comparisons to the third and fourth standards.

5. The method of claim 4, further comprising:

providing a fifth predetermined command from the robot to the welding-type power supply for a third parameter;

comparing the fifth predetermined command to a fifth standard;

providing a sixth predetermined command from the robot to the welding-type power supply for the third welding parameter;

comparing the sixth predetermined command to a sixth standard; and calculating a third command scaling curve for the second parameter in response to the comparisons to the fifth and sixth standards.

6. The method of claim 4, wherein the at least one parameter is output voltage and the second parameter is wire feed speed.

7. A method of calibrating a welding-type power supply and a robot, comprising:

providing a weld schedule to the robot that has at least a first setting and a second setting for at least one welding parameter, wherein the first and second settings are different;

entering a calibration mode, including not providing a welding output;

providing a first command corresponding to the first setting from the robot to the welding-type power supply;

comparing the first command to a first expected command for the first setting;

providing a second command corresponding to the first setting from the robot to the welding-type power supply;

comparing the second comma to a second expected command for the second setting; and calculating a command scaling curve for the parameter in response to the comparisons.

8. The method of claim 7, wherein the first and second settings are predetermined.

9. The method of claim 7, wherein the first and second settings are user determined.

10. The method of claim 7, wherein the at least one parameter is one of wire feed speed, output voltage or arc length.

11. The method of claim 7, wherein the weld schedule has at least a third setting for the at least one parameter, wherein the first, second and third settings are different, and further comprising:

providing a third command corresponding to the third setting from the robot to the welding-type power supply; and comparing the third command to a third expected command for the third setting;

wherein calculating includes calculating in response to the comparisons to the first, second and third expected commands.

12. The method of claim 7, further comprising, providing feedback from the welding-type power supply to the robot that is indicative of a commanded output.

13. A method of calibrating a welding-type power supply and a robot, comprising:

providing a weld schedule to the robot that has at least a first setting and a second setting for at least one welding parameter, wherein the first and second setting are different, wherein the at least one parameter is one of wire feed speed, output voltage or arc length;

entering a calibration mode;

provide a first command corresponding to the first setting from the robot to the welding-type power supply;

comparing the first command to a first expected command for the first setting;

providing a second command corresponding to the first setting from the robot to the welding-type power supply;

comparing the second comma to a second expected command for the second setting; and calculating a command scaling curve for the parameter in response to the comparisons.

14. A method of calibrating a welding-type power supply and a robot, comprising:

providing a weld schedule to the robot that has at least a first setting and a second setting for at least one welding parameter, wherein the first and second settings are different;

entering a calibration mode;

providing a first command corresponding to the first setting from the robot to the welding-type power supply;

comparing the first command to a first expected command for the first setting;

providing a second command corresponding to the first setting from the robot to the welding-type power supply;

comparing the second command to a second expected command for the second setting;

calculating a command scaling curve for the parameter in response to the comparisons;

wherein the weld schedule as at least a third setting and a fourth setting for a second welding parameter, wherein the third and fourth settings are different, and providing a third command corresponding to the third setting from the robot to the welding-type power supply;

comparing the third command to a third expected command for the third setting;

providing a fourth command corresponding to the fourth setting from the robot to the welding-type power supply;

comparing the fourth command to fourth expected command for the fourth setting; and calculating a second command scaling curve for the second parameter in response to the comparisons.

15. The method of claim 14, wherein the at least one parameter is output voltage and the second parameter is wire feed speed.

16. A welding-type power supply that may be connected to a robot, comprising:
   means for entering a calibration mode including not providing a welding output;
   means for receiving a first predetermined command from the robot for at least one welding parameter;
   means for comparing the first predetermined command to a first standard;
   means for receiving a second predetermined command from the robot for the at least one welding parameter;
   means for comparing the second predetermined command to a second standard; and
   means for calculating a command and scaling curve for the parameter in response to the mean for comparing.

17. The welding-type power supply of claim 16, wherein the at least one parameter is output voltage.

18. The welding-type power supply of claim 16, further comprising, means for providing feedback from the welding-type power supply to the robot that is indicative of a commanded output.

19. A welding-type power supply that may be connected to a robot, comprising:
   means for entering a calibration mode;
   means for receiving a first predetermined command from the robot for at least one welding parameter, wherein the at least one parameter is wire feed speed;
   means for comparing the first predetermined command to a first standard;
   means for receiving a second predetermined command from the robot for the at least one welding parameter;
   means for comparing the second predetermined command to a second standard; and
   means for calculating a command scaling curve for the parameter in response to the means for comparing.

20. A welding-type power supply that may be connected to a robot, comprising:
   means for entering a calibration mode;
   means for receiving a first predetermined command from the robot for at least one welding parameter;
   means for comparing the first predetermined command to a first standard;
   means for receiving a second predetermined command from the robot for the at least one welding parameter;
   means for comparing the second predetermined command to a second standard;
   means for calculating a command scaling curve for the parameter in response to the mean for comparing;
   means for receiving a third predetermined command from the robot for a second welding parameter;
   means for comparing the third predetermined command to a third standard;
   means for receiving a fourth predetermined command from the robot for the at least one welding parameter;
   means for comparing the fourth predetermined command to a fourth standard; and
   means for calculating a second command scaling curve for the second parameter in response to the means for comparing the third and fourth standards.

21. The welding-type power supply of claim 20, wherein the at least one parameter is output voltage and the second parameter is wire feed speed.

22. A welding-type wer supply that may be connected to a robot, comprising:
   means for receiving a weld schedule from the robot that has at least a first setting and a second setting for at least one welding parameter, wherein the first and second settings are different;
   means for entering a calibration mode including not providing a welding output;
   means for receiving a first command corresponding to the first setting from the robot;
   means for comparing the first command to a first expected command for the first setting;
   means for receiving a second command corresponding to the first setting from the robot;
   means for comparing the second command to a second expected command for the second setting; and
   means for calculating a command scaling curve for the parameter in response to the means for comparisons.

23. The welding-type power supply of claim 22, wherein the first and second settings are predetermined.

24. The welding-type power supply of claim 22, wherein the first and second settings are user determined.

25. A welding-type power supply that may be connected to a robot, comprising:
   means for receiving a weld schedule from the robot that has at least a first setting and a second setting for at least one welding parameter, wherein the first and second settings are different, and wherein the at least one parameter is one of wire feed speed a d output voltage;
   means for entering a calibration mode;
   means for receiving a first command corresponding to the first setting from the robot;
   means for comparing the first command to a first expected command for the first setting;
   means for receiving a second command corresponding to the first petting from the robot;
   means for comparing the second command to a second expected command for the second setting; and
   means for calculating a corn scaling curve for the parameter in response to the mean for comparisons.

26. A welding-type power supply that may be connected to a robot, comprising:
   means for receiving a weld schedule from the robot that has at least a first setting and a setting for at least one welding parameter, wherein the first and second setting are different:
   means for entering a calibration mode;
   means for receiving first command corresponding to the first setting from the robot;
   means for comparing the first command to a first expected command for the first setting;
   means for receiving a second command corresponding to the first setting from the robot;
   means for comparing the second command to a second expected command for the second setting;
   means for calculating a command scaling curve for the parameter in response to the means for comparisons;
   wherein the weld schedule has at least a third setting and a fourth setting for a second welding parameter, wherein the third and fourth settings are different, and means for receiving a third command corresponding to the third setting from the robot;
   means for comparing the third command to a third expected command for the third setting;
   means for receiving a fourth command corresponding to the fourth setting from the robot;

means for comparing the fourth command to a fourth expected command for the fourth setting; and means for calculating a second command scaling curve for the second parameter in response to the means for comparing the third and fourth commands.

27. A welding-type power supply that may be connected to a robot, comprising:

a first comparison module receiving, when no welding output is provided, as an input a first predetermined command from the robot and a first standard, wherein the first predetermined command and the first standard correspond to a first welding parameter;

a second comparison module receiving, when no welding output is provided as an input a second predetermined command from the robot and a second standard, wherein the second predetermined command and the second standard correspond to the first welding parameter; and a curve fitting module receiving as an input an output of the first and second comparison modules, and having a first parameter command scaling curve output.

28. The welding-type power supply of claim 27, further comprising, a calibration feedback circuit having an output indicative of a commanded output.

29. A welding-type power supply that may be connected to a robot, comprising:

a first comparison module receiving as an input a first predetermined command from the robot and a first standard, wherein the first predetermined command and the first standard correspond to a first welding parameter, wherein the at least one parameter is one of wire feed speed and output voltage;

a second comparison module receiving as an input a second predetermined command from the robot and a second standard, wherein the second predetermined command and the second standard correspond to the first welding parameter; and a curve fitting module receiving as an input an output of the first and second comparison modules, and having a first parameter command scaling curve output.

30. The welding-type power supply of claim 29, further comprising:

a third comparison module receiving as an input a third predetermined command from the robot and a third standard, wherein the third predetermined command an the third standard correspond to a second welding parameter;

a fourth comparison module receiving as an input a fourth predetermined command from the robot and a fourth standard, wherein the fourth predetermine command and the fourth standard correspond to the second welding parameter; and a second curve fitting module receiving as an input an output of the third and fourth comparison modules, and having a second parameter command scaling curve output.

31. The welding-type power supply of claim 30, wherein the at least one parameter is output voltage and the second parameter is wire feed speed.

32. A welding-type power supply that may be connected to a robot, comprising:

a calibration module having a weld schedule input and a command output, and an output that inhibits the providing of a welding output;

a comparison module having as an input the command output, and further having as an input a first standard, and further having as an input a second standard, wherein the first command and the first and second standards correspond to a first welding parameter; and a curve fitting module receiving as an input an output of the comparison module, and having a first parameter command scaling curve output.

33. The welding-type power supply of claim 32, having a user interface, wherein the first and second standard inputs are outputs of the user interface.

34. The welding-type power supply of claim 32, having a memory, wherein the first and second standard inputs are outputs of the memory.

35. The welding-type power supply of claim 32, wherein the comparison module further has as an input a fifth standard, wherein the fifth standard corresponds to the first welding parameter.

36. A welding-type power supply that may be connected to a robot, comprising:

a calibration module having a weld schedule input and a command output;

a comparison module having as an input the command output, and further having as an input a first standard, and further having as an input a second standard, wherein the first command and the first and second standards correspond to a first welding parameter, wherein the at least one parameter is one of wire feed speed a d output voltage;

a curve fitting module receiving as an input an output of the comparison module, and having a first parameter command scaling curve output.

37. A welding-type power supply that may be connected to a robot, comprising:

a calibration module having a weld schedule input and a command output;

a comparison module having as an input the second output, and further having as an input a first standard, and further having as an input a second standard, wherein the first command and the first and second standards correspond to a first welding parameter;

a curve fitting module receiving as an input an output of the comparison module, and having a first parameter command scaling curve output; and wherein the comparison module further has as an input a third standard and a fourth standard, wherein a portion of the first command and the third and fourth standards correspond to a second welding parameter, and further wherein the curve fitting module has a second parameter command scaling curve output.

38. A method of calibrating a welding-type power supply and a robot, comprising:

entering a calibration mode, and not providing a welding output;

providing a first predetermined command from the robot to the welding-type power supply for at least one welding parameter;

comparing the first predetermined command to a first standard; and calculating a command scaling curve for the parameter in response to the comparison.

39. A method of calibrating a welding-type power supply and a robot, comprising:

entering a calibration mode;

providing a first predetermined command from the robot to the welding-type power supply for at least one welding parameter, wherein the at least one parameter is one of wire feed speed, output voltage, trim;

comparing the first predetermined command to a first standard;

calculating a command scaling curve for the parameter in response to the comparison.

40. A method of calibrating a welding-type power supply and a robot, comprising:

entering a calibration mode;

providing a first predetermined command from the robot to the welding-type power supply for at least one welding parameter;

comparing the first predetermined command to a first standard;

calculating a command scaling curve for the parameter in response to the comparison;

providing a second predetermined command from the robot to the welding-type power supply for a second welding parameter;

comparing the second predetermined command to a second standard;

providing a fourth predetermined command from the robot to the welding-type power supply for the at least one welding parameter;

comparing the fourth predetermined command to a fourth standard; and calculating a second command scaling curve for the second parameter in response to the comparisons to the third and fourth standards.

41. A method of calibrating a welding-type power supply and a robot, comprising:

providing a weld schedule to the robot that has at least a first setting;

entering a calibration mode, and not providing a welding output;

providing a first command a corresponding to the first setting from the robot to the welding-type power supply;

comparing the first command to a first expected command for the first setting;

calculating a command scaling curve for the parameter in response to the comparison.

42. A method of calibrating a welding-type power supply and a robot, comprising:

providing a weld schedule to the robot that has at least a first setting;

entering a calibration mode;

providing a first command a corresponding to the first setting from the robot to the welding-type power supply;

comparing the first command to a first expected command for the first setting;

calculating a command scaling curve for the parameter in response to the comparison;

wherein the weld schedule has at least a second setting for a second welding parameter, and providing a second command corresponding to the second setting from the robot to the welding-type power supply;

comparing the second command to a second expected command for the second setting; and calculating a second command scaling curve for the second parameter in response to the comparison.

* * * * *